United States Patent [19]
Hudak

[11] 3,882,189
[45] May 6, 1975

[54] POLYESTER RESINS PREPARED FROM ORGANIC POLYISOCYANATES AND BLENDS WITH OTHER RESINS OR MONOMERS

[75] Inventor: Stephen F. Hudak, Minneapolis, Minn.

[73] Assignee: Ashland Oil, Inc., Ashland, Ky.

[22] Filed: Apr. 19, 1973

[21] Appl. No.: 352,482

Related U.S. Application Data

[60] Division of Ser. No. 145,502, May 20, 1971, Pat. No. 3,759,873, which is a continuation of Ser. No. 716,349, March 27, 1968, abandoned.

[52] U.S. Cl. ...... 260/850; 204/159.14; 204/159.19; 260/18 TN; 260/29.2 TN; 260/29.4 R; 260/31.2 XA; 260/31.4 R; 260/33.6 UB; 260/75 EP; 260/75 N; 260/75 T; 260/75 UA; 260/858; 260/859
[51] Int. Cl. ...................... C08g 37/34; C08g 39/10
[58] Field of Search .................................... 260/850

[56] References Cited
UNITED STATES PATENTS

| | | | |
|---|---|---|---|
| 3,384,606 | 5/1968 | Dieterich et al. | 260/850 |
| 3,759,873 | 9/1973 | Hudak | 260/850 |

*Primary Examiner*—John C. Bleutge
*Assistant Examiner*—J. Ziegler

[57] ABSTRACT

Polyester resins containing urethane linkages, comprising:

A. The reaction product of (1) a polyester prepared from at least one polycarboxylic acid and at least one polyhydric alcohol substantially free of unsaturated reactants and naturally occurring oils, and (2) an organic polyisocyanate; the ratio of (1) and (2) being such that equivalents of hydroxyl/equivalents of (carboxyl + isocyanate) is greater than 1 and up to about 2.0 and the ratio of equivalents of carboxyl/equivalents of isocyanate is greater than 1 and up to about 30; or B. The reaction product of (1) a polyester prepared from at least one alpha, beta-ethylenically unsaturated polycarboxylic acid and at least one polyhydric alcohol, and (2) an organic polyisocyanate; the ratio of (1) to (2) being such that the ratio of equivalents of hydroxyl/equivalents of (carboxyl + isocyanate) is 0.5 to 2.0 and the ratio of equivalents of carboxyl/equivalents of isocyanate is greater than 1 and up to about 30.

Film forming compositions made by blending the saturated resin (A), which may be water dispersible, with 5 to 50 percent of an aminoplast resin in water or organic solvent, or with a free isocyanate containing prepolymer or adduct, or by blending the unsaturated resin (B) with an ethylenically unsaturated monomer and effecting addition polymerization.

4 Claims, No Drawings

POLYESTER RESINS PREPARED FROM ORGANIC POLYISOCYANATES AND BLENDS WITH OTHER RESINS OR MONOMERS

This is a division, of application Ser. No. 145,502, filed May 20, 1971 now U.S. Pat. No. 3,759,873, a continuation of application Ser. No. 716,349 filed Mar. 27, 1968, now abandoned.

BACKGROUND OF THE INVENTION

Known polyesters are valuable as coating materials. These polyesters, however, have deficiencies such as, long dry time, poor durability, poor flexibility, and inadequate gloss which prevent their use in certain applications. The introduction of polyurethane linkages into the polymer chain in accordance with this invention alleviates the deficiencies of the unmodified polyesters, making the modified polyesters useful in a greater number of applications.

Blends of saturated polyesters with other resins to effect crosslinked coatings are well-known in the art. It is also known to combine unsaturated polyesters with ethylenically unsaturated monomers and to cause addition polyermization between the unsaturated polyester and the monomer. It is also known that certain polyesters can be amine treated to promote water dispersibility and blended with water dispersible resins to effect crosslinked coatings. The present invention offers improvements in these blends by modifying both saturated and unsaturated polyester resins to include polyurethane linkages in the polyester chain in a manner that does not adversely affect the essential reactive properties with the combined resin or monomer.

SUMMARY OF THE INVENTION

This invention relates to novel polyester resins and more particularly to polyester resins having urethane linkages in the polymer chain. The polyesters modified in accordance with this invention may be admixed with a variety of synthetic resins or unsaturated monomers to produce blends with new, unique, and valuable properties.

The polyurethane modified polyesters of this invention generally exhibit improved hardness and flexibility. Blending with isocyanate prepolymers, for instance, is facilitated by improved compatibility and solubility gained as a result of the isocyanate modification. The modified unsaturated polyesters have excellent dry time, durability and gloss. The water dispersible modified polyesters have excellent hardness, flexibility and appearance. These improved properties are directly attributable to the introduction of polyurethane linkages into the polyester.

Accordingly, it is an object of this invention to produce polyesters having polyurethane linkages in the polyester chain.

It is a further object of this invention to produce modified polyesters which have improved hardness, gloss and flexibility.

Another object of this invention is to produce modified polyesters of greater compatibility with isocyanate containing prepolymers.

Still another object is to provide urethane modified polyesters having improved dry time characteristics.

Further objects will be apparent from the following description of the invention.

A. THE URETHANE MODIFIED POLYESTERS

This invention relates to the modification of two distinct classes of polyesters:

1. saturated oil free polyesters dispersed in organic solvents or water and
2. unsaturated polyesters.

The inventive concept is identical in both cases, although the products are quite different because of the differences in the nature of the polyester portion of the polymer molecule.

Both polyester resins of this invention are prepared in a two step reaction sequence comprising the steps of:

1. forming the polyester by condensation of polyol and polycarboxylic acid, and
2. introduction of urethane linkages by reaction of an excess of the polyester of step 1 with an organic polyisocyanate.

The first step of polyester formation is well-known in the art. It is advantageously conducted under reflux in an inert solvent such as xylene at a temperature from about 200°–450°F. for a period sufficient to lower the acid number to a point where substantially complete reaction has occurred. This point where substantially complete reaction has occurred. This point will be reached in a period from about 5 minutes to about 10 hours. The acid number of the saturated polyester after the first step and prior to reaction with polyisocyanate is preferably in the range about 4–20 for the organic solvent cuts and from 30–70 for the water dispersible types. The acid number of the unsaturated polyester may have a value up to about 60.

The second step of the process, the reaction of polyester with organic polyisocyanate, is conducted at a temperature in the range of about 120°F. to about 400°F. The polyesters that are cut in organic solvents are ordinarily processed under reflux. The water dispersible types are processed close to 100 percent solids. The polyisocyanate is added dropwise over a period of about 5 minutes to about 2 hours. The reaction mixture may then be diluted with inert solvent in the case of the organic solvent types and maintained at an elevated temperature of about 150°–400°F. for a period of about ½ hour to about 4 hours to obtain a constant viscosity and to insure complete reaction of the polyisocyanate. The water dispersible type is processed in like manner except that no organic solvent is added during the reaction.

The ratios of the various reactants depend on the nature of the polyester and whether it is saturated, oil free, or unsaturated. In the preparation of the solvent cut, saturated urethane modified polyesters, the ingredients are chosen so that the ratio of equivalents of hydroxyl/equivalents of (carboxyl + isocyanate) is greater than 1 and up to about 2.0; preferably about 1.15 to 1.35; and the ratio of carboxyl/isocyanate being greater than 1 and up to about 30, perferably about 4 to 8. In the preparation of the water dispersible, saturated, urethane modified polyesters, the ingredients are chosen so that the ratio of equivalents of hydroxyl/equivalents of (carboxyl + isocyanate) is 0.5 to 2.0; preferably about 1.1 to 1.5; and the ratio of carboxyl/isocyanate being greater than 1 and up to about 30, preferably about 4 to 8.

In the preparation of the urethane modified unsaturated polyester, the ratio of equivalents of hydroxyl-/equivalents of (carboxyl + isocyanate) is from 0.5 to 2.0 the ratio of carboxyl/isocyanate being greater than 1 and up to about 30. Although it is operable for the isocyanate to be in excess of the carboxyl, it is not preferred. The preferred ratios are 1.1 to 1.3 for hydroxyl-/equivalents of (carboxyl + isocyanate) and 5 to 15 for carboxyl/isocyanate.

The reactants used in the preparation of the novel polymeric materials of this invention are those conventionally used in the polyester art and the polyurethane art.

Polyols suitable for use in this invention are generally those having molecular weights ranging from 62 to 350. Representative glycols include:
  ethylene glycol;
  propylene glycol
  trimethylene glycol;
  1,2-butylene glycol;
  1,3-butanediol;
  1,4-butanediol;
  1,5-pentanediol;
  1,2-hexylene glycol;
  1,10-decanediol;
  1,2-cyclohexanediol;
  2-butene-1,4-diol;
  3-cyclohexene-1,1-dimethanol;
  4-methyl-3-cyclohexene-1,1-dimethanol; and
  3-methylene-1,5-pentanediol.

Further examples of aliphatic polyols include alkylene oxide modified diols such as:
  diethyleneglycol;
  (2-hydroxyethoxy)-1-propanol;
  4-(2-hydroxyethoxy)-1-butanol;
  5-(2-hydroxyethoxy)-pentanol;
  3-(2-hydroxypropoxy)-1-propanol;
  4-(2-hydroxypropoxy)-1-butanol;
  5-(2-hydroxypropoxy)-1-pentanol;
  1-(2-hydroxyethoxyl)-2-butanol;
  1-(2-hydroxyethoxy)-2-pentanol;
  1-(2-hydroxymethoxy)-2-hexanol;
  1-(2-hydroxyethoxy)-2-octanol;
  1-(2-hydroxypropoxy)-2-butanol;
  1-(2-hydroxypropoxy)-2-propanol;
  1-(2-hydroxypropoxy)-2-hexanol; and
  1-(2-hydroxypropoxy)-2-octanol.

Polyols having at least 3 hydroxyl groups are advantageously included in minor amounts in the preparation of the modified polyesters of this invention, e.g., in an amount ranging from about 5 to 25% of the modified polyester intermediate.

Representative examples of low molecular weight polyols having at least 3 hydroxy groups include:
  glycerol;
  1,2,6-hexanetriol;
  1,1,1-trimethylolpropane;
  1,1,1-trimethylolethane;
  pentaerythritol;
  3-(2-hydroxyethoxy)-1,2-propanediol;
  3-(2-hydroxypropoxy)-1,2-propanediol;
  6-(2-hydroxyethoxy)-1,2-hexanediol;
  2,4-dimethyl-2-(2-hydroxyethoxy)methylpentanediol-1,5;
  mannitol;
  galactitol;
  talitol;
  iditol;
  allitol;
  altritol;
  gulitol;
  arabitol;
  rabitol;
  xylitol; lyxitol;
  erythritol;
  threitol;
  1,2,5,6-tetrahydroxy hexane;
  meso-insoditol;
  sucrose;
  glucose;
  galactose;
  mannose;
  fructose;
  xylose;
  arabinose;
  dihydroxyacetone;
  1,1,1-tris-[(2-hydroxyethoxy)methyl]ethane; and
  1,1,1-tris-[(2-hydroxypropoxy)methyl]propane.

Other examples are included in U.S. Pat. No. 2,917,468.

The above-mentioned polyols may be used in both the saturated or unsaturated urethane modified polyesters. In addition, ethylenically unsaturated polyols may be included in the unsaturated modified polyesters.

Representative examples of ethylenically unsaturated low molecular weight diols include:
  3-allyloxy-1,5-pentanediol;
  3-allyloxy-1,2-propanediol;
  2-allyloxymethyl-2-methyl-1,3-propanediol;
  2-methyl-2-[(4-pentaenyloxy)methyl]-1,3-propanediol; and
  3-(o-propenylphenoxy)-1,2-propanediol.

Part of the diol may be replaced with a diol containing other functional group such as carboxyl or oxirane groups. In an important aspect of this invention a portion of the diol is replaced with a diol containing a free carboxylic acid group. Water dispersibility of the polyester intermediate and the urethane modified polyester product are achieved by this variation. Dimethylol propionic acid is a preferred example of a diol containing a carboxyl group which can be used to impart water dispersibility to the resins of this invention. The resin products, containing excess carboxyl groups by virtue of the above described modification are easily dispersed or dissolved in water by neutralization with amines such as the lower alkyl amines. Triethyl amine is a preferred neutralization agent. Other useful diols are listed in U.S. Pat. Nos. 2,927,098 and 2,854,486.

The acids which may be used are aliphatic, aromatic, or cycloaliphatic polycarboxylic acids or their anhydrides. The following are representative of those acids commonly used and suitable for both the saturated and unsaturated polymers of this invention: azelaic; phthalic; adipic; isophthalic; dichlorophthalic; trimellitic; pyromellitic; succinic; cyclohexanedicarboxylic; dimer acids (as those derived from fatty acids); terephthalic; and the like.

In the preparation of the unsaturated urethane modified polyesters, it is contemplated that, in accordance with one embodiment of this invention, the unsaturation be introduced by the condensation of alpha, beta-ethylenically unsaturated acids in the polyester intermediate. Examples of suitable unsaturated dicarboxylic acids include the following: maleic, fumaric, itaconic, ethylmaleic, and the like. The anhydrides of alpha, beta-ethylenically unsaturated acids may be used in place of or as partial substitution for the alpha, beta-ethylenically unsaturated acids.

In the preparation of the unsaturated polyester intermediates, it is frequently desirable to include an addition polymerization inhibitor during the polyester condensation reaction. The inhibitors also serve to stabilize the package urethane modified unsaturated polyester and ethylenically unsaturated monomer composition which is contemplated in this invention.

Examples of inhibitors are, among others: hydroquinone; benzaldehyde; ascorbic acid; resorcinol; and symmetrical di(beta-naphthyl)-p-phenylene diamine. These inhibitors can comprise up to 0.03 percent or more preferably 0.013 to 0.020 percent by weight of theoretical yield of modified polyester.

A number of aliphatic, cycloaliphatic, and aromatic polyisocyanates are useful in introducing the urethane linkage into the polyester chain. The following, among others, may be used:

toluene-2,4-diisocyanate;
3-phenyl-2-ethylenediisocyanate;
1,5-naphthalenediisocyanate;
cumene-2,4-diisocyanate;
4-methoxy-1,3-phenylenediisocyanate;
4-chloro-1,3-phenylenediisocyanate;
4-bromo-1,3-phenylenediisocyanate;
4-ethoxy-1,3-phenylenediisocyanate;
2,4'-diisocyanatodiphenyl ether;
5,6-dimethyl-1,3-phenylenediisocyanate;
2,4-dimethyl-1,3-phenylenediisocyanate;
4,4'-diisocyanatodiphenyl ether;
benzidinediisocyanate;
4,6-dimethyl-1,3-phenylenediisocyanate;
9,10-anthracenediisocyanate;
4,4'-diisocyanatodibenzyl;
3,3'-dimethyl-4,4'-diisocyanatodiphenylmethane;
2,6-dimethyl-4,4'-diisocyanatodiphenyl;
2,4-diisocyanatostilbene;
3,3'-dimethyl-4,4'-diisocyanatodiphenyl;
3,3'-dimethoxy-4,4'-diisocyanatodiphenyl;
1,4-anthracenediisocyanate;
2,5-fluorenediisocyanate;
1,8-naphthalenediisocyanate;
1,3-phenylenediisocyanate;
methylene-bis(4-phenylisocyanate);
2,6-diisocyanatobenzylfuran;
2,4,6-toluenetriisocyanate;
2,4,4'-triisocyanatodiphenyl ether;
bis(2-isocyanatoethyl)fumarate;
bis(2-isocyanatoethyl)carbonate; and
bis(2-isocyanatoethyl)-4-cyclohexene-1,2-dicarboxylate.

Representative monomeric aliphatic polyisocyanates useful in the present invention include, among others:

1,4-tetramethylenediisocyanate;
1,6-hexamethylenediisocyanate;
1,10-decamethylenediisocyanate;
1,3-cyclohexylenediisocyanate; and
4,4'-methylene-bis(cyclohexylisocyanate).

B. BLENDS OF THE URETHANE MODIFIED POLYESTERS WITH OTHER POLYMERS OR MONOMERS

The urethane modified saturated polyesters of this invention are suited for blending with a variety of resins, particularly aminoplasts. The organic solvent cut, saturated polyesters are further suited for blending with free isocyanate containing adducts or prepolymers, to prepare novel coating compositions.

The aminoplasts include those resins formed by the condensation of an amine or amide with an aldehyde. Among the aminoplasts there may be mentioned alkylated and non-alkylated melamine aldehyde; triazine aldehyde; dicyandiamide aldehyde; and urea aldehyde resins. A preferred aminoplast for many organic solvent applications is butylated melamine formaldehyde resin. Certain of the known water soluble aminoplasts such as methylol melamine are preferred for blending with the water dispersible resins of this invention.

The aminoplast should comprise 5 to 50 percent, and preferably 15 to 30 percent of the composition. Acid catalysts may be advantageously included, particularly when alkylated aminoplasts are used, and should be present in a concentration of from 0.1 to 2.0 percent by weight of the modified polyester resin. Examples of suitable acid catalysts are phosphoric, sulphuric, trichloroacetic, and p-toluene sulphonic acids. The preferred catalyst is p-toluene sulphonic acid.

Typically, the blend of aminoplast and solvent cut, modified polyester is diluted in a suitable organic solvent for both resins, such as butyl cellosolve, and the composition applied to the desired surface by any of the conventional methods of brushing, dipping, or spraying. This is true also for the water dispersible, modified polyester except that water is used to dilute both water dispersible resins. The coating may then be baked at an elevated temperature of about 150°F. to 400°F. for 10 minutes to 1 hour. These coatings find use as automotive and appliance finishes, as coil coatings and the like.

The organic solvent cut, saturated urethane modified polyesters of this invention find another preferred use in blends with non-volatile isocyanate intermediates commonly known as free NCO adducts or free NCO prepolymers. These blends have utility in a variety of application, particularly as seamless flooring compositions.

The presence of urethane groups in films is desirable because these films have, in general outstanding resistance to alkalis, salt water, and chemicals, and have good weathering properties, high gloss, and abrasion resistance. The urethane modified polyesters allow the introduction of a large number of urethane groups and, at the same time, allow the exploitation of the reaction between the hydroxyl groups of the modified polyester and the free isocyanate groups of the adduct.

It is known in the art that the use of aliphatic or cycloaliphatic diisocyanates is preferably to the aromatic because of the tendency of the latter to form films which yellow upon aging. Difficulty with solubility in common solvents has limited the use of aliphatic diisocyanate derived urethanes in two component blends. The aliphatic urethane modified polyesters of this invention exhibit improved solubility, and, thus, allow the introduction of the desirable aliphatic and cycloaliphatic groups into the blends which are soluble in common organic solvents such as xylene.

Free isocyanate adducts, such as intended to be blended with urethane modified polyesters, are well-known in the art. Generally, they are prepared by the reaction of a polyol with an excess of an organic diisocyanate. The polyol may be of the type listed above as suitable for the preparation of the polyesters, or the polyol may be a polyalkylene glycol or a hydroxyl terminated polyester. The essential feature is that an excess of diisocyanate be used in the preparation so that free isocyanate groups are present to react with the hydroxyl groups of the urethane modified polyester.

The equivalent ratio, N, of isocyanate groups to hydroxyl groups (—NCO/OH) in the blend of free isocyanate adduct and urethane modified polyester should be 0.7 to 2.0, and preferably 1.0 to 1.6. The weight of isocyanate intermediate to add to 100 parts of urethane modified polyester is determined by the following equation:

$$\frac{\text{hydroxyl number of urethane modified polyester} \times 7.5 \times N}{\% \text{ —NCO in isocyanate containing adduct}}$$

Films are commonly made by dissolving the blend in a suitable solvent such as xylene and depositing the film on the desired surface, such as a floor. The films are self-curing at ordinary temperatures.

Dyes, pigments, fillers, and the like may be added in accordance with procedures well-known in the art.

The urethane modified unsaturated polyesters are intended to be blended with copolymerizable ethylenically unsaturated monomers. Copolymerizable monomers, which generally have boiling points above 60°C. and which are described, for example, in U.S. Pat. Nos. 2,443,735; 2,407,470; 2,491,404; 2,931,784; and 3,210,441, are generally vinyl monomers having one or more

groups such as:

1. the allyl monomers, examples of which include:
   allyl acetate
   diallyl phthalate
   diallyl isophthalate
   triallyl phosphate
   diallyl ether
2. acids, examples of which include:
   acrylic acid
   methacrylic acid
   maleic acid
   fumaric acid
   itaconic acid.
3. esters of these acids with lower alkanols, examples of which include:
   methyl acrylate
   methyl methacrylate
   diethyl fumarate
4. the so-called vinyl monomers, examples of which include:
   vinyl acetate
   vinyl butyrate
   vinyl alcohol
   vinyl ether
   vinyl cyanide (acrylonitrile)
   vinyl chloride
   vinylidene chloride
5. vinyl aromatic monomers and vinyl heteroaromatic monomers, examples of which include, among others:
   vinyl benzene (styrene)
   divinyl benzene
   $\alpha$-methyl styrene
   $\alpha$-chloro styrene
   vinyl toluene
   vinyl pyridine
   vinyl pyrrolidone.

Compatible mixtures of two or more to the above can also be used. The vinyl monomer can constitute from less than 10 to over 90 weight percent, but preferably constitutes from 30 to 70 weight percent, of the coating composition. When operating outside these ranges, these novel compositions tend to cure slowly.

In order to facilitate the copolymerization of the ethylenically unsaturated compound with the unsaturated modified polyester, it is preferred that a polymerization initiator be incorporated in the composition prior to the time of its curing. In general, it is preferred to employ an amount of polymerization initiator sufficient to initiate polymerization, and generally, from about 0.001 to about 2.0 percent by weight of the total composition. The type and the exact amounts of these polymerization initiators, which can be used, are well-known in the art; and any material which normally induces polymerization of unsaturated polyesters can be utilized. The optimum reaction conditions are modified to some extent by the choice of the particular catalyst used in the process. A very active catalyst should be used in lower concentrations, and preferably at lower temperatures, than a less reactive material. The catalysts that are preferably employed comprise a wide variety of organic superoxides, i.e., organic peroxides ("acidic peroxides") and hydroperoxides ("alcoholic peroxides"). Mixtures of peroxides and hydroperoxides, including commercially available mixtures such as methyl ethyl ketone peroxide, cyclohexanone peroxide, and the like, are especially effective polymerization initiators. Examples of organic peroxides tht can be employed include, among others, acetyl peroxide, benzoyl peroxide, substituted benzoyl peroxides and particularly halogenated benzoyl peroxides such as p-bromobenzoyl peroxide, 2,4-dichlorobenzoyl peroxide, etc., benzoyl acetyl peroxide, phthalyl peroxide, succinyl peroxide, fatty oil acid peroxides such as cocoanut oil peroxide, lauryl peroxide, stearyl peroxide, oleyl peroxide, anisoyl peroxide, toluyl peroxide, and the like. Organic peracids such as peracetic acid and perbenzoic acid can also be employed. Among the organic hydroperoxide catalysts that can be employed are tertiary butyl hydroperoxide, cumene hydroperoxide, diisopropyl benzene hydroperoxide, 1-hydroxycyclohexyl hydroperoxide; the terpene oxides such as ascaridole and 1-p-menthane hydroperoxide. Various other types of polymerization catalysts may also be employed, i.e., compounds such as aluminum chloride, stannic chloride, boron trifluoride, or the azo-type catalysts such as $\alpha,\alpha'$-azobisisobutyronitrile.

Addition polymerization accelerators such as the metal carboxylates can be added to these novel compositions in minor amounts up to 1.0 weight percent based on the total weight of the composition. An effective amount has been found to be 0.01 to 0.06 weight percent. Metals such as copper, iron, manganese, zinc, nickel, or cobalt, which is preferred, can be used in the form of their naphthenates, octoates, acetates, maleates, or linoresinates. Cobalt naphthenate is particularly preferred.

Under certain circumstances, even faster curing action can be achieved with the use of accelerators such as amines or amine salts. These amines may be primary, secondary, tertiary amines or amine salts, as well as quaternary amine salts, suitable examples of which include, among others, ethylamine, 2-ethylhexylamine, aminobenzoic acid, phenyl ether ethanolamine, cyclohexylamine, phenyl hydrazine, dibutylamine, diethanolamine, diamylamine, diallylamine, dicyclohexylamine, triethanolamine, triethylamine, triethyltetramine, betaine, amino pyridine, piccoline, dimethyl aniline, benzyl trimethyl ammonium chloride. These amines may be added in quantities up to about 0.1 percent of the weight of the composition.

The cure of the novel compositions of the present invention can be accelerated by exposure to high energy electrons (100 kilo electron volts to 1.5 million electron volts, for example) by $\gamma$-radiation, X-Ray radiation or ultraviolet radiation. Curing of unsaturated polyester-vinyl monomer compositions is known in the art.

These novel compositions can be modified physically and/or chemically by the addition of agents such as pigments, extenders, plasticizers, ultraviolet light stabilizers, solvents, drying oils, coloring agents, pacifiers, release agents, and lubricants.

The compositions comprising urethane modified polyester can be generally employed wherever the compositions comprising unmodified polyester and mixtures thereof with other resins and monomers have been used, such as coatings for wood, ceramic, ferrous metals, nonferrous metals, and the like. When applied by such procedures as dipping, brushing, or spraying, these novel compositions can be used to protect the coated substrate from the adverse effects of weather, water, and air. Thus, such useful objects as wooden and metal boats, lawn chairs, houses, barns, and the like, can be advantageously coated with these novel compositions.

The blends of this invention are advantageously and preferably packages for commerce as "two-package systems." By "two-package systems" it is meant that the two reactive resin components of a composition are stored, sold and shipped in separate packages. The separate packages are part of an integral unit and are meant to be mixed together just prior to use. Either or both of the packages may contain solvent, filler, pigments, dyes, plasticizers, and like components, which are conventional coating additives. The essential feature of the two-package system is that one reactive resin such as the saturated urethane modified polyester of this invention appears in a separate package from a component reactable therewith, such as free isocyanate adduct or aminoplast resin.

The invention may be better understood by reference to the following examples, in which all parts and percentages are by weight unless otherwise indicated. These examples are designed to teach those skilled in the art how to practice the invention and to represent the best mode contemplated for carrying out the present invention, and are not intended to limit the scope of the invention in any manner.

EXAMPLE 1

Step 1

This example illustrates the preparation of a saturated urethane modified polyester.

A mixture having the following ingredients:
  83.0 parts of isophthalic acid
  292.0 parts of adipic acid
  136.5 parts of trimethylolethane
  119.0 parts of neopentyl glycol
  80.3 parts of 2,2,4-trimethyl-1,3-pentanediol
  132.0 parts of hydrogenated bisphenol A
was heated with 3% xylene in a suitable vessel for esterification by the solvent (azeotropic) process. A nitrogen blanket was used throughout the reaction. An adequate reflux rate was maintained to remove the water of esterification. The reaction was held at a temperature of 450°F. maximum until an acid number (number of mg KOH required for neutralizing 1 gram of resin sample) of 6–8 was obtained.

Step 2

The reaction mass of Step 1 was cooled to 150°–170°F. The water trap was removed and a clean, dry condenser and dropping funnel was mounted to the vessel. 87.0 Parts of toluenediisocyanate was charged to the dropping funnel and allowed to enter the reaction mix dropwise over a half hour interval. The exotherm was allowed to reach 170°–180°F. during the diisocyanate addition. 500 Parts of xylene was then charged to the dropping funnel and added in 4 increments to the reaction mix at 15 minute intervals. The temperature varied between 170°–200°F. during the addition of the xylene. A temperature of about 200°F. was maintained for 3 hours after the addition of the xylene in order to obtain a constant viscosity and to insure that the diisocyanate was completely reacted.

This product had the following constants:

| | |
|---|---|
| % Nonvolatiles | 60 (±1) |
| Acid value | 7.2 (based on solids) |
| Color | 2– |
| Viscosity | Z2–, 35.0 stokes |
| Solvent | Xylene |

EXAMPLE 2 (Control)

This was a control polyester for comparison purposes wherein isophthalic acid was substituted for the toluenediisocyanate on a mole per mole basis in Example 1. Therefore, 166 parts of isophthalic acid was used instead of the 83.0 parts as outlined in Example 1.

This polyester was prepared as described in Step 1 of Example 1. The ingredients were esterified to an acid number of 10–15 and the product was cut to 60 percent with xylene.

The constants of this product were as follows:

| | |
|---|---|
| % Nonvolatiles | 60 (±1) |
| Acid value | 12.1 |
| Color | 1– |
| Viscosity | Y, 17.6 stokes |
| Solvent | Xylene |

EXAMPLE 3

This example illustrates the preparation of a saturated urethane modified polyester. The procedure of Step 1, Example 1, was repeated esterifying the ingredients to an acid number of 7-9. This initial polyester was then cut to 70% non-volatiles with xylene. At a temperature of 240°F. a premix of 105.0 parts dicyclohexylmethane-4,4'-diisocyanate, 45 parts xylene, and 0.2 parts of D-22 catalyst (dibutyltin dilaurate) was added dropwise to the reaction mix over a 40 minute period. The temperature was allowed to rise from 240°F. to 296°F. during the addition of the diisocyanate premix. After the last drop of diisocyanate premix had entered the reaction mix, the temperature was maintained at 300°F. for a period of about 4 hours in order to obtain a constant viscosity and to insure the complete reaction of the diisocyanate. The product was cut to 60% nonvolatiles with xylene and had the following constants:

| % Nonvolatiles | 60 (±1) |
| Acid value | 5.0 |
| Viscosity | Z1+, 29.0 strokes |
| Color | 4− |
| Solvent | Xylene |

EXAMPLE 4

This example illustrates the preparation of a saturated urethane modified polyester. The procedure of Step 1, Example 1, was repeated esterifying the ingredients to an acid number of 8-10. This initial polyester was then cut to 70% nonvolatiles with xylene. At a temperature of 240°F. a premix of 123.3 parts of bis(2-isocyanatoethyl)-4-cyclohexene-1,2-dicarboxylate and 0.2 parts of D-22 catalyst (dibutyltin dilaurate) was added dropwise to the reaction mix over a period of 20 minutes. The temperature was allowed to rise from 240°F. to 280°F. during the addition of the diisocyanate. After the last drop of diisocyanate had entered the reaction mix, the temperature was maintained at 300°F. for a period of 2 hours in order to botain a constant viscosity and to insure the complete reaction of the diisocyanate. The product was cut to 60% nonvolatiles in xylene and had the following constants:

| % Nonvolatiles | 60 (±1) |
| Acid value | 6.6 |
| Viscosity | U ½ |
| Color | 3 |
| Solvent | Xylene. |

EXAMPLE 5

This example illustrates the preparation of a saturated urethane modified polyester. The procedure of Step 1, Example 1, was repeated eliminating the isophthalic acid charge and esterifying the ingredients to an acid value of 6-8. The resultant polyester was then cooled to 158°F. 174 Parts of toluenediisocyanate were started dropwise to the reaction mix. The reaction was allowed to exotherm freely. 100 Parts of xylene were added to the vessel of a temperature of 198°F. and after one half of the diisocyanate charge had entered the reaction. The remainder of the diisocyanate continued to enter the reaction mix for an additional 10 minutes. Immediately after all the diisocyanate had entered the reaction, 480 parts of xylene were added to 4 increments at 10 minute intervals. The temperature was maintained around 180°F. during the addition of the xylene. The temperature was then raised to 200°–210°F. and held an additional hour. The product was cut to 50% nonvolatiles with cellosolve acetate. The constants were as follows:

| % Nonvolatiles | 50 (±1) |
| Acid value | 4.9 |
| Viscosity | Z 2½, 43.0 strokes |
| Color | 3 |
| Solvent | Xylene/cellosolve Acetate, 67/33 |

EXAMPLE 6

This example illustrates the preparation of a saturated urethane modified polyester. A mixture having the following ingredients:

83.0 parts of isophthalic acid
117.0 parts of adipic acid
100.0 parts of trimethylol propane
265.0 parts of P-410 (a polyoxypropylene glycol of molecular weight about 400 — from Wyandotte Chemicals)

was processed as in Step 1, Example 1, to an acid number of 8-10. This initial polyester was then cut to 70% with xylene.

At a temperature of 248°F. the water trap was removed and a clean, dry condenser and dropping funnel was mounted to the vessel. 131.2 Parts of dicyclohexylmethane-4,4'-diisocyanate dissolved in 56 parts of xylene were charged to the dropping funnel and allowed to enter the reaction mix dropwise over a half hour interval. The temperature was gradually increased from 248°F. to 308°F. during the addition of the diisocyanate. The product was then cut to 60% nonvolatiles with xylene and held at 298°F. for 2 hours to obtain a constant viscosity and to insure that the diisocyanate was completely reacted. The product had the following constants:

| % Nonvolatiles | 60 (±1) |
| Acid value | 7.0 |
| Viscosity | T½ |
| Color | 2½ |
| Solvent | Xylene |

EXAMPLE 7

This example illustrates the preparation of a saturated urethane modified polyester. The procedure of Step 1, Example 1, was repeated esterifying the ingredients to an acid number of 4-8. This initial polyester was then cut to 70% nonvolatiles with xylene. At a temperature of 270°F. a premix of 100.0 parts of bis(2-isocyanatoethyl)-carbonate and 0.4 parts of D-22 catalyst (dibutyltin dilaurate) were added dropwise to the reaction mix over a period of 15 minutes. The temperature was allowed to rise from 270°F. to 298°F. during the addition of the diisocyanate. After the last drop of diisocyanate had entered the reaction mix, the temperature was maintained at 290°F. −296°F. for a period of 2 hours to obtain a constant viscosity and to insure the complete reaction of the diisocyanate. The product was cut to 50% nonvolatiles with a mixture of xylene and cellosolve acetate to give a final solvent ratio of 80/20 xylene/cellosolve acetate. This product had the following constants:

| % Nonvolatiles | 50 (±1) |
| --- | --- |
| Acid value | 4.3 |
| Viscosity | V½ |
| Color | 2— |
| Solvent | Xylene/cellosolve acetate, 80/20 |

EXAMPLE 8

This example illustrates the preparation of a saturated urethane modified polyester. A mixture having the following ingredients:

- 182.5 parts of isophthalic acid
- 219.0 parts of adipic acid
- 201.0 parts of trimethylol propane
- 162.0 parts of neopentyl glycol
- 360.0 parts of hydrogenated bisphenol A was processed as in Step 1, Example 1, to an acid number of 6–10. This initial polyester was then cut to 70% nonvolatiles with xylene.

At a temperature of 250°F. a premix of 262.5 parts of dicyclohexylmethane-4,4'-diisocyanate and 112.0 parts of xylene were added dropwise to the reaction mix over a 45 minute period. The temperature was allowed to rise from 250°–300°F. during the addition of the diisocyanate. After the last drop of diisocyanate had entered the reaction mix, the temperature was held at 300°F. for 3 hours. The product was cut to 60% nonvolatiles with a mixture of xylene and cellosolve acetate to give a final solvent ratio of 70/30 xylene/cellosolve acetate. The product had the following constants:

| % Nonvolatiles | 60 (±1) |
| --- | --- |
| Acid value | 4.8 |
| Viscosity | Z 2+ |
| Color | 2+ |
| Solvent | Xylene/cellosolve acetate, 70/30 |

EXAMPLE 9

This example illustrates the preparation of a saturated urethane modified polyester. The procedure of Example 8 was repeated using the following charge for the formation of the initial polyester:

- 166.0 parts of isophthalic acid
- 234.0 parts of adipic acid
- 201.0 parts of trimethylol propane
- 183.5 parts of neopentyl glycol
- 312.0 parts of hydrogenated bisphenol A.

This urethane (dicyclohexylmethane-4,4'-diisocyanate) polyester had the following constants:

| % Nonvolatiles | 60 (±1) |
| --- | --- |
| Acid value | 3.1 |
| Viscosity | Y½ |
| Color | 3— |
| Solvent | Xylene/cellosolve acetate, 70/30 |

EXAMPLE 10

This example illustrates the preparation of a saturated urethane modified polyester. The procedure of Example 8 was repeated using the following charge for the formation of the initial polyester:

- 166.0 parts of isophthalic acid
- 234.0 parts of adipic acid
- 201.0 parts of trimethylol propane
- 108.0 parts of neopentyl glycol
- 480.0 parts of hydrogenated bisphenol A.

This urethane (dicyclohexymethane-4,4'-diisocyanate) polyester was cut with a mixture of xylene and cellosolve acetate to give a final solvent ratio of 90/10 xylene/cellosolve acetate, and had the following constants:

| % Nonvolatiles | 60 (±1) |
| --- | --- |
| Acid value | 5.0 |
| Color | 1½ |
| Viscosity | Z 2 |
| Solvent | Xylene/cellosolve Acetate, 90/10. |

EXAMPLE 11

This example illustrates the preparation of a saturated, urethane modified, water dispersible polyester.

STEP 1

A mixture having the following ingredients:
- 166.0 parts of isophthalic acid
- 226.0 parts of azelaic acid
- 144.0 parts of 1,4-butanediol
- 94.0 parts of dimethylol propionic acid
- 50.5 parts of glycerine
- 168.0 parts of hydrogenated bisphenol A was charged to a three neck flask fitted with a thermometer, inert gas inlet, agitator, and fractionating column (partial condenser) packed with glass beads. A thermometer and water trap were inserted at the top of the fractionating column. A total condenser, water cooled, was mounted to the water trap.

The charge was heated to maintain a temperature of 212°F. at the top of the fractionating column to insure the removal of water of esterification. The temperature of the reaction mix reached 428°F. maximum as esterification continued to an acid number of 59.8. The reaction was stopped at this point.

STEP 2

The fractionating column, total condenser, and water trap were removed and replaced with a clean, dry total condenser and dropping funnel. 131.2 Parts of Hylene w (an aliphatic diisocyanate made by E. I. DuPont De Nemours and Company and believed to be a liquid isomer of dicyclohexylmethane-4,4'-diisocyanate) were charged to the dropping funnel and allowed to drip into the reaction mix at a temperature of 280°F. After the last drop of Hylene W had entered the reaction mix the temperature was gradually increased to 310°–320°F and held there for 2 1/2 hours. The product was then cooled to 290°F and cut to 70% N.V. with butyl cellosolve.

At room temperature 264.0 grams of deionized water were thoroughly stirred into 976.0 grams of the 70% N.V. polyester. This was followed by the addition of 51.5 grams of triethyl amine, 225.0 grams of deionized water and 55.0 grams of butyl cellosolve. After a brief period of agitation the product became clear and was infinitely soluble in water. The final constants were as follows:

| % Non-volatiles | 45.0 |
| --- | --- |
| pH | 8.6 |
| Viscosity | U½, 8.0 stokes |
| Color | 3½ |
| Acid number | 43.5 |

EXAMPLE 12

This example illustrates the preparation of a saturated, urethane modified, water dispersible polyester.

STEP 1

A mixture having the following ingredients:
74.0 parts of phthalic anhydride
292.0 parts of adipic acid
200.0 parts of TP-440 (a polyoxypropylene derivative of trimethylolpropane made by Wyandotte Chemical Corp.)
100.0 parts of dimethylol propionic acid
216.0 parts of neopentyl glycol
89.0 parts of hydrogenated bisphenol A
was processed as in Step 1, Example 11, to an acid number of 55.5.

STEP 2

The fractionating column, total condenser and water trap were removed and replaced with a clean, dry total condenser and dropping funnel. 87.0 Parts of toluenediisocyanate were charged to the dropping funnel and allowed to drip into the reaction mix at a temperature of 150°F. The reactor was allowed to exotherm freely. After the last drop of toluenediisocyanate had entered the reaction mix the temperature was gradually increased to 240°-250°F and held there for 2 1/2 hours. The product was then cut to 70% N.V. with butyl cellosolve.

At room temperature 408.0 grams of deionized water were thoroughly stirred into 1025.0 grams of the 70% N.V. polyester. This was followed by the addition of 49.0 grams of triethyl amine. After a brief period of agitation the product became clear and had the following constants:

| % Non-volatiles | 50.0 |
| --- | --- |
| pH | 6.8 |
| Viscosity | O, 3.7 Stokes |
| Color | 4 |
| Acid number | 41.0 |

EXAMPLE 13

This example illustrates the preparation of an isocyanate polyol adduct as a component for evaluating the hydroxyl containing urethane modified polyesters of this invention in two component urethane coating systems.

The adduct was prepared by heating a mixture of 235.0 parts of toluenediisocyanate and 417.5 parts of bis(2-isocyanatoethyl)-4-cyclohexene-1,2-dicarboxylate to 90°F. A mixture of 67.0 parts of trimethylol propane, 67.5 parts of 1,3-butanediol and 263.0 parts of urethane grade ethyl acetate, previously dried, was the allowed dropwise into the diisocyanate mix over a period of 1 hour. The reaction was allowed to exotherm freely and a temperature of 168°F. was reached as the last drop of polyol solution entered the reaction mix. The temperature continued to increase and was held at 180°-190°F. for an additional 6 hours until a constant viscosity of X-Y was obtained. This adduct had the following constants:

| % Non-volatiles | 75 (±1) |
| --- | --- |
| Viscosity | X¾ |
| Color | 1— |
| % NCO | 8.34 based on 75% nonvolatiles |
| NCO/OH equivalent ratio | 1.8 |

EXAMPLE 14

This example illustrates the preparation of a urethane modified unsaturated polyester.

STEP 1

A mixture of the following ingredients:
109.5 parts of phthalic anhydride
529.0 parts of maleic anhydride
585.0 parts of 1,3-butylene glycol
74.5 parts of ethylene glycol
0.3 part of hydroquinone
1.0 part of Thermolite 187 (an organic phosphite stabilizer sold by M & T Chemicals Inc.)
was charged to a three necked flask fitted with a thermometer, inert gas inlet, agitator and fractionating column (partial condenser) packed with glass beads. A thermometer and water trap were inserted at the top of the fractionating column. A total condenser, water cooled, was mounted to the water trap.

The charge was heated to 352°F. at which time the temperature at the top of the fractionating column increased to 212°F. due to the evolution of the water of esterification. The temperature at the top of the fractionating column was maintained at 212°F. as the temperature of the reaction mix was gradually increased to 430°-450°F. The reaction mix temperature was held at 430°-450°F. until an acid number of 40 was obtained.

STEP 2

The fractionating column was removed and the water trap with attached total condenser was mounted to the reaction flask. The reaction mix was cooled to 350°F. and the water trap filled with xylene. 289.0 Parts of trimethylol propane diallyl ether were added to the mix, followed by 45.0 parts of xylene. The esterification was continued at 440°F. maximum to an acid number of 12. The reaction mix was then cooled to 186°F. The total condenser and water trap were removed and replaced with a clean, dry total condenser and dropping funnel. 104.5 Parts of toluene diioscyanate were charged to the dropping funnel and allowed to drip into the reaction mix. The temperature was increased to 200°F. and held there for 1 hour after the last drop of toluene diisocyanate had entered the reaction mix. The product was then cooled to 190°F. and diluted with 624.0 parts of styrene.

This product had the following constants:

| % Non-volatiles | 70 (±1) |
| --- | --- |
| Acid value | 9.3 |
| Viscosity | Z 3—, 44.8 stokes |
| Color | 2 |

EXAMPLE 15

This example illustrates the preparation of a urethane modified unsaturated polyester.

Step 1

The procedure of Step 1, Example 14, was repeated using the following ingredients:
152.0 parts of tetrahydrophthalic anhydride
196.0 parts of maleic anhydride
229.0 parts of diethylene glycol
134.0 parts of ethylene glycol
0.6 part of Thermolite 187.

Step 2

The fractionating column was removed and the water trap with attached total condenser was mounted to the reaction flask. The trap was filled with xylene and 20.0 parts of xylene were added to the reaction mix for azeotropic removal of water.

The esterification was continued at 420°F. to an acid number of 10–12. The reaction mix was cooled to 260°F. and the water trap removed. A clean, dry condenser and dropping funnel containing 157.5 parts of 4,4'-methylene bis(cyclohexyl isocyanate) and 17.5 parts of xylene were mounted to the flask. The diisocyanate solution was added dropwise over a 30 minute period and the temperature allowed to increase to 350°F. The reaction was held at 350°F. for 1 1/2 hours. The product was cooled to 180°F. and diluted with a mixture of 30.0 parts acetonitrile, 275.0 parts styrene and 0.15 part hydroquinone.

This product had the following constants:

| | |
|---|---|
| % Nonvolatiles | 70 (±1) |
| Acid value | 8.0 |
| Viscosity | Y¼, 19.8 strokes |
| Color | 2 |

EXAMPLE 16–27

These examples illustrate the preparation of blends of organic solvent cut, saturated urethane modified polyester and aminoplasts.

A series of polyester/aminoplast blends were prepared with a weight ratio of polyester/aminoplast of 75/25 and reduced to 40% nonvolatiles with butyl cellosolve. Examples 26 and 27 were identically prepared with water as the solvent. The aminoplasts used were Resimine 881 and Resimine 879 which are butylated melamine formaldehyde resins from Monsanto and R12027 which is a water soluble methylol melamine resin obtained from Monsanto. The polyester of Example 2 and HRT 12 polyester (a trimethylolpropane, neopentyl glycol, adipic acid, isophthalic acid polyester formulated by Amoco Chemicals) were used as controls. The urethane modified polyesters prepared in Examples 1, 3, 4, 11, and 12 are compared to the controls in Table I. Films of each blend were cast at 3.0 mil wet thickness and baked at 300°F. for 30 minutes.

The baked films were tested for alkali resistance, xylene resistance, and pencil hardness. Xylene and alkali resistance were determined by placing 6 drops of xylene or 6 drops of 5% sodium hydroxide on the film and allowing 15 minutes contact time. The liquid was then removed and the effect on the film rated on a 0–10 scale where 0 is a severe effect and 10 is no effect.

Pencil hardness was determined by noting the hardest pencil which will not break the film surface. Pencil hardness in order from soft to hard is 6B, 5B, 4B, 3B, 2B, B, HB, F, H, 2H, 3H, 4H, 5H, 6H.

G-E impact was conducted on aluminum Bonderite 721, 3 × 9 × 0.25 inch. Gardner Reverse Impact was on Bonderite 1000 steel, 24 gage.

The results of the various tests described above are tabulated in Table I, below.

TABLE I

| Example | Polyester | Aminoplast | Mar | Pencil Hardness | Xylene Resistance | Alkali Resistance | G-E Impact on Alumin. (%) | Gardner Reverse Impact on Steel (in. lbs.) | Sward Hardness |
|---|---|---|---|---|---|---|---|---|---|
| 16 (Control) | Example 2 | Resimine 881 | F | HB | 7 | 9 | 60 | 160 | 38 |
| 17 (Control) | HRT–12 | " | | | | Cloudy incompatible film | | | |
| 18 | Example 1 | " | G | 2H | 7 | 10 | 60 | 160 | 56 |
| 19 | Example 3 | " | G | H | 7 | 9 | 60 | 160 | 46 |
| 20 | Example 4 | " | G | H | 7 | 9 | 60 | 160 | 50 |
| 21 (Control) | Example 2 | Resimine 879 | G | 3H | 7 | 9 | 20 | 60 | 58 |
| 22 (Control) | HRT–12 | " | G | 3H | 9 | 10 | 20 | 50 | 58 |
| 23 | Example 1 | " | | | | Cloudy incompatible film | | | |
| 24 | Example 3 | " | G | 3H | 8 | 10 | 40 | 105 | 60 |
| 25 | Example 4 | " | G | 3H | 8 | 10 | 40 | 105 | 60 |
| 26 | Example 11 | R12027 | G | F | 6 | 10 | 60 | 160 | 66 |
| 27 | Example 12 | " | Ex | 2H | 7 | 10 | 40 | 120 | 120 |

EXAMPLES 28–34

This series of Examples illustrates blends of the organic cut, saturated urethane modified polyesters of this invention and nonvolatile free isocyanate containing adducts.

Films were prepared by casting the blends at 50% nonvolatile in xylene solvent at a 3.0 mil wet film thickness. The films were placed in a constant temperature and humidity room (77°F. and 50% relative humidity). All the blends were clear solutions and gave clear films. Films aged for one week were tested for mar, alkali, and xylene resistance in the manner described in Examples 16–27.

G-E impact tests were conducted on tin, 3 × 10 inches, 30–31 gage (PG 3202 from Gardner Lab. Inc.).

The amount of isocyanate containing adduct to add to 100 parts of the urethane modified polyester was determined by the following relation:

$$\frac{\text{Hydroxyl no. of urethane polyester} \times 7.5}{\% \text{ —NCO in isocyanate containing adduct}} \times \text{Ratio of —NCO/OH desired} = \frac{\text{Parts of isocyanate adduct}}{100 \text{ Parts of urethane polyester}}$$

The —NCO/OH ratio selected for these Examples was 1.4. In each case the urethane polyester had a hydroxyl number of 100 (±5) and was blended with the isocyanate adduct of Example 13 which had a % —NCO value of 11.1 at 100% nonvolatile.

The results of the tests conducted are summarized in Table II below.

TABLE II

| Example | Urethane Polyester of Example | Isocyanate Intermed. of Example | Pass 500 g Zapon test (hours) | 24 hr. Sward Hardness | Sward Hardness after 1 wk. | G-E Impact on Tin (%) | Mar Resistance | Xylene Resistance | Alkali Resistance | Pot Life (hrs) |
|---|---|---|---|---|---|---|---|---|---|---|
| 28 | 3 | 11 | 6½ | 22 | 30 | 60 | VG | 10 | 10 | 6½ |
| 29 | 4 | 11 | 7 | 18 | 22 | 60 | VG | 9 | 10 | >7 |
| 30 | 5 | 11 | 6½ | 24 | 40 | 60 | EX | 10 | 10 | 5½ |
| 31 | 7 | 11 | 7 | 16 | 22 | 60 | VG | 9 | 10 | 5 |
| 32 | 8 | 11 | 3¾ | 34 | 44 | 60 | EX | 10 | 10 | >7 |
| 33 | 9 | 11 | 4¼ | 30 | 40 | 60 | EX | 10 | 10 | >7 |
| 34 | 10 | 11 | 3¾ | 34 | 44 | 40 | EX | 10 | 10 | >7 |

EXAMPLES 35 and 36

These examples illustrate blends comprising urethane modified unsaturated polyesters and unsaturated monomers.

To the blend of unsaturated urethane modified polyester and unsaturated monomer (styrene), methylethyl ketone peroxide was added in an amount of 1.5% of the blend and 0.025% by weight of cobalt was added as cobalt naphthenate.

Films were cast at 3.0 mil wet thickness and kept at 77°F. and 50% relative humidity.

Gardner Reverse Impact tests were conducted on tin, 3 × 10 inches. 30-31 gage (PG 3202 from Gardner Lab, Inc.) and aluminum, Bonderite 621, 3 × 9 × .0018 inch. The results, along with other test results, are tabulated in Table III, below.

TABLE III

| Example | Unsaturated Polyester of Example | Unsaturated Monomer (Styrene) | Pass 500 g Zapon (hrs.) | 24 hr. Sward Hardness | Sward Hardness after 1 wk. | Mar | Gardner Reverse Impact on Tin (in.lbs.) | Gardner Reverse Impact on Aluminum (in.lbs.) |
|---|---|---|---|---|---|---|---|---|
| 35 | 12 | 50% | 4½ | 40 | 54 | G | 60 | 20 |
| 36 | 13 | 50% | 6½ | 36 | 48 | F | 60 | 20 |

Although the invention has been described in considerable detail with reference to certain preferred embodiments, it will be understood that variations can be made within the spirit and scope of the invention as described above and as defined in the appended claims.

I claim:

1. A water reducible resinous coating composition comprising from 95 to 50 parts by weight of (1) a water-soluble lower alkyl amine salt of a polyurethane modified polyester consisting essentially of the reaction product of:
   a. a mixture of saturated polyhydroxy alcohols of which from about 5 to 25 percent by weight contains at least three functional groups and wherein one of said three functional groups is a carboxyl group,
   b. at least one saturated polycarboxylic acid, and;
   c. an organic polyisocyanate compound; said reaction product being the result of preliminary reaction between (a) and (b) to form a saturated polyester intermediate which is subsequently reacted with (c) to form the modified polyester; the proportion of the reactants (a), (b) and (c) being selected so that the OH/(COOH+NCO) ratio is from 1 to 2.0 and the COOH/NCO ratio is greater than 1 and up to about 30 and correspondingly from 5 to 50 parts of an aminoplast resin.

2. A coating composition in accordance with claim 1 comprising from 85 to 70 parts of said salt of the polyurethane modified polyester and correspondingly from 15 to 30 parts of said aminoplast resin.

3. A coating composition in accordance with claim 2 wherein said aminoplast resin is selected from the group consisting of alkylated melamine aldehyde condensates, non-alkylated melamine aldehyde condensates, dicyandiamide aldehyde condensates, and urea aldehyde condensates.

4. A coating composition in accordance with claim 3 wherein said aminoplast resin is a butylated melamine formaldehyde resin.

* * * * *